United States Patent
Byun

(10) Patent No.: US 10,419,112 B2
(45) Date of Patent: Sep. 17, 2019

(54) MONITORING SYSTEM USING OPTICAL LINE

(71) Applicant: SEUNGJAE CO., LTD., Bucheon-si (KR)

(72) Inventor: Jae Hee Byun, Seoul (KR)

(*) Notice: Subject to any disclaimer, the term of this patent is extended or adjusted under 35 U.S.C. 154(b) by 0 days.

(21) Appl. No.: 15/737,368

(22) PCT Filed: Jul. 3, 2015

(86) PCT No.: PCT/KR2015/006852
§ 371 (c)(1),
(2) Date: Dec. 18, 2017

(87) PCT Pub. No.: WO2016/204331
PCT Pub. Date: Dec. 22, 2016

(65) Prior Publication Data
US 2018/0183514 A1     Jun. 28, 2018

(30) Foreign Application Priority Data

Jun. 16, 2015   (KR) .................. 10-2015-0085483

(51) Int. Cl.
*H04B 10/079*     (2013.01)
*H04B 10/071*     (2013.01)
(Continued)

(52) U.S. Cl.
CPC ....... *H04B 10/0799* (2013.01); *G08B 13/124* (2013.01); *H04B 10/071* (2013.01);
(Continued)

(58) Field of Classification Search
None
See application file for complete search history.

(56) References Cited

U.S. PATENT DOCUMENTS

| | | | | |
|---|---|---|---|---|
| 5,129,721 A | * | 7/1992 | Sakamoto | .......... G01M 11/3145 356/73.1 |
| 6,771,358 B1 | * | 8/2004 | Shigehara | .......... G01M 11/3136 356/73.1 |
| 2004/0178935 A1 | * | 9/2004 | Iio | .......................... H04J 14/08 341/100 |

(Continued)

FOREIGN PATENT DOCUMENTS

| | | |
|---|---|---|
| JP | 11-185174 | 7/1999 |
| JP | 2006-215649 | 8/2006 |

(Continued)

OTHER PUBLICATIONS

English Abstract of 2006-215649.
(Continued)

*Primary Examiner* — Kenneth N Vanderpuye
*Assistant Examiner* — David W Lambert
(74) *Attorney, Agent, or Firm* — Antonio Ha & U.S. Patent, LLC

(57) ABSTRACT

A monitoring system using an optical line is disclosed. The monitoring system using an optical line according to the present invention comprises: a laser diode for generating an input optical signal; an optical element for receiving the input optical signal through a first port and outputting same through a second port, and for receiving a reflected optical signal through the second port and outputting same through a third port; an optical switch unit for receiving the input optical signal through an input port connected to the second port of the optical element, and for distributing same through at least two output ports; at least one optical monitoring line connected to the output ports of the optical switch unit; a photodiode connected to the third port of the optical element, for detecting the reflected optical signal; and a signal processing unit for processing the signal detected by the photodiode.

16 Claims, 2 Drawing Sheets

(51) Int. Cl.
  H04B 10/077 (2013.01)
  H04B 10/50 (2013.01)
  H04B 10/69 (2013.01)
  H04Q 11/00 (2006.01)
  G08B 13/12 (2006.01)

(52) U.S. Cl.
  CPC ......... H04B 10/077 (2013.01); H04B 10/503 (2013.01); H04B 10/691 (2013.01); H04Q 11/0062 (2013.01); *H04Q 2011/0083* (2013.01)

(56) References Cited

U.S. PATENT DOCUMENTS

2004/0208501 A1* 10/2004 Saunders ........... H04B 10/0793 398/9
2006/0013585 A1* 1/2006 Hnatiw .................... G01J 3/28 398/38
2012/0155871 A1* 6/2012 Fukashiro ............... H04J 14/02 398/50

FOREIGN PATENT DOCUMENTS

| | | | |
|---|---|---|---|
| JP | 2006215649 A | * | 8/2006 |
| JP | 2012-008104 | | 1/2012 |
| JP | 2012008104 A | * | 1/2012 |
| KR | 10-2008-0041106 | | 5/2008 |
| KR | 10-1171270 | | 8/2012 |
| KR | 101171270 B1 | * | 8/2012 |

OTHER PUBLICATIONS

English translation of 10-1171270.
English Abstract of 2012-008104.
English translation of 10-2008-0041106.
English Abstract of 11-185174.

* cited by examiner

[Fig. 1]
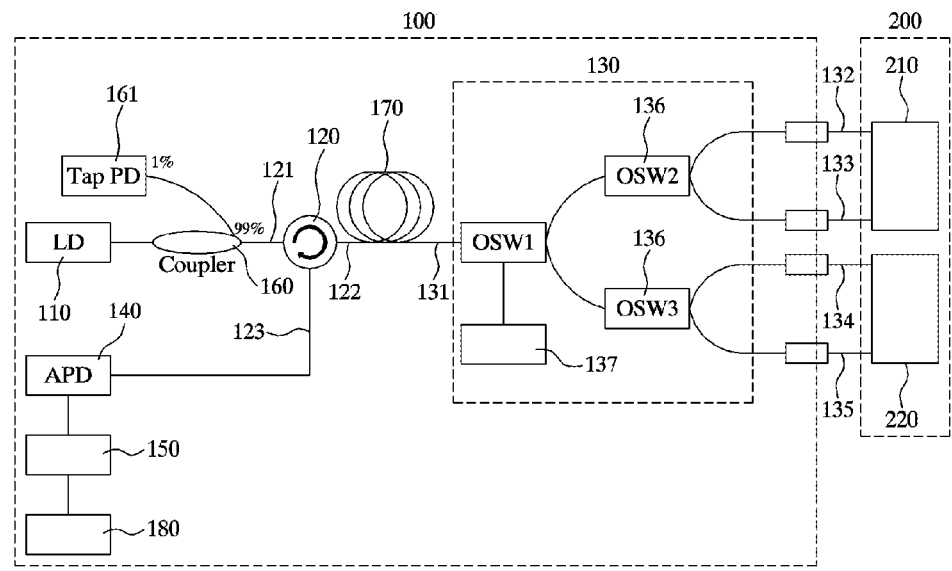
[Fig. 2]
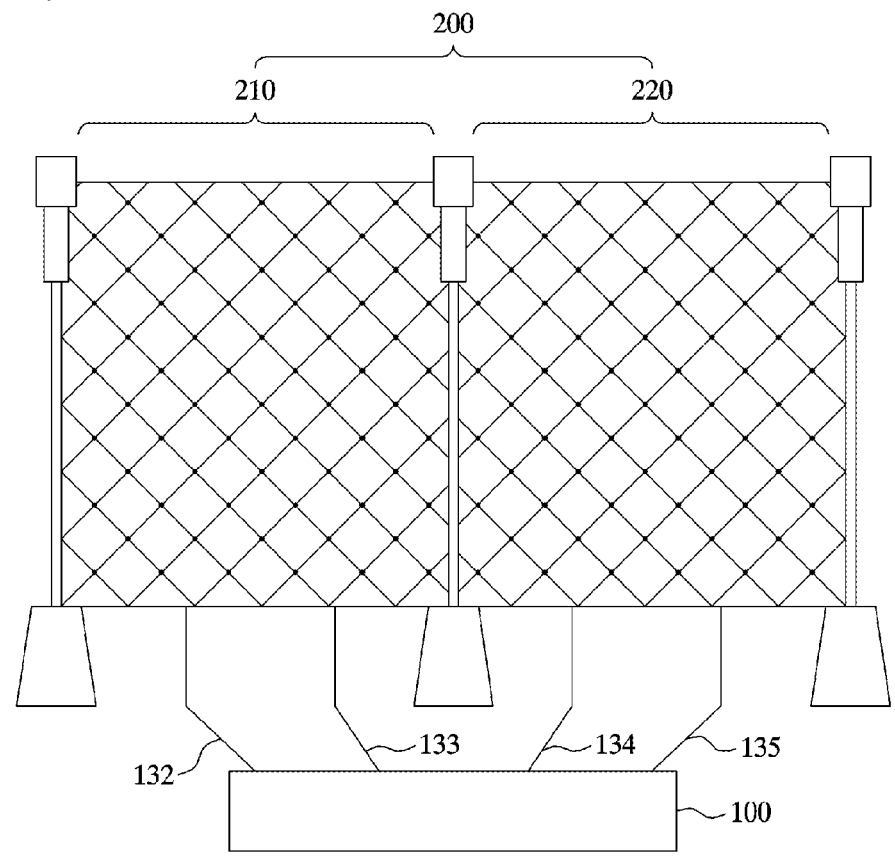

[Fig. 3]
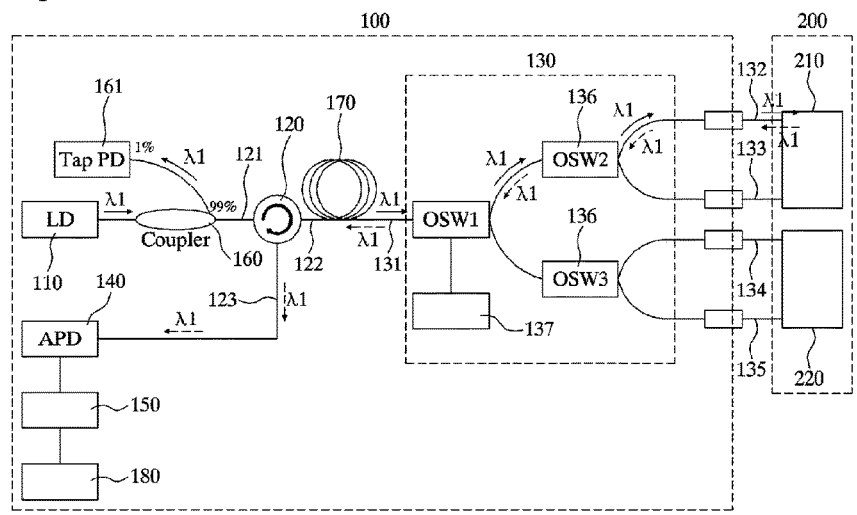
[Fig. 4]
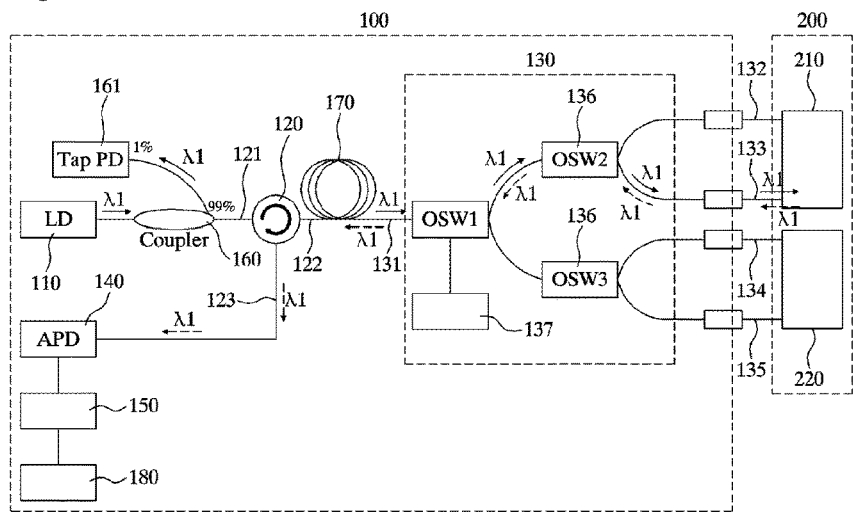
[Fig. 5]
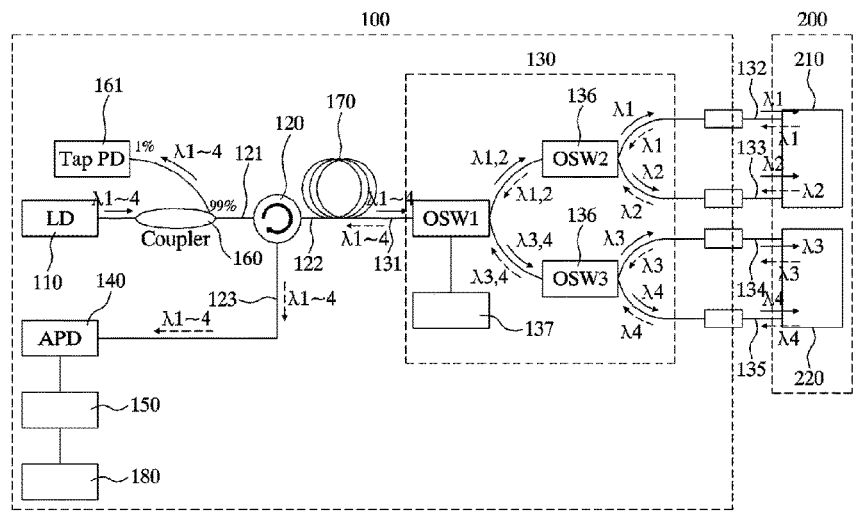

MONITORING SYSTEM USING OPTICAL LINE

TECHNICAL FIELD

The present invention relates to a monitoring system using an optical line (or an optical line monitoring system) and, more particularly, to a system for determining an intrusion by sensing bending, severing, and the like, of an optical line network for security purposes.

BACKGROUND ART

Security fences are often installed in facilities and areas requiring security. Also, in order to monitor an intrusion into the security fences, monitoring personnel may be deployed. However, a monitoring scheme based on monitoring personnel incurs high maintenance cost and has low monitoring accuracy.

As a complement, recently, a monitoring method using a CCTV has widely been used. This method is reduced in labor input but still disadvantageous in that a person should directly monitor a captured screen. Also, in case where a monitoring area is as large as a few kilometers or greater, a larger amount of camera devices is required to be installed, increasing cost for installation and maintenance of the devices.

Also, recently, a radio frequency (RF) scheme has been used. According to the RF scheme, a transmission line is installed in a security fence and an electrical RF signal is applied to the transmission line. If an intruder passes through or damages the transmission line, the RF signal is changed to automatically detect the intrusion. This scheme, however, has shortcomings in that a location where intrusion occurs may not be accurately specified.

An optical line monitoring method using an optical fiber solves the shortcomings. The optical line monitoring method using an optical fiber is advantageous in that a large area may be monitored, intrusion alarm may be automatically made, and a location where intrusion occurs may be specified to be recognized. However, an optical line monitoring device used for the optical line monitoring method is costly.

DISCLOSURE

Technical Problem

An aspect of the present invention provides an optical line monitoring system capable of monitoring an area as large as possible by a single optical line monitoring device.

Another aspect of the present invention provides an optical line monitoring system capable of maximizing accuracy of intrusion detection, while monitoring an area as large as possible.

Another aspect of the present invention provides an optical line monitoring system which is economical but has excellent durability.

Technical Solution

In an aspect of the present invention, an optical line monitoring system includes: a laser diode generating an input optical signal; an optical element receiving the input optical signal by a first port and outputting the received input optical signal to a second port and receiving a reflected optical signal by the second port and outputting the received reflected optical signal to a third port; an optical switch unit receiving the input optical signal by an input port connected to the second port of the optical element and distributing the input optical signal to at least two output ports; at least one monitoring optical line connected to each of the output ports of the optical switch unit; a photodiode connected to the third port of the optical element and detecting the reflected optical signal; and a signal processing unit processing the signal detected by the photodiode.

In an embodiment of the present invention, the optical switch unit may distribute the input optical signal according to a time division scheme.

In an embodiment of the present invention, the optical switch unit may distribute the input optical signal to each output port on a first time cycle, and the first time cycle may be longer than a time for which the input optical signal is generated in the laser diode and reaches an end of the monitoring optical line and a reflected optical signal formed as the input optical signal is reflected from the end of the monitoring optical line reaches the optical switch unit.

In an embodiment of the present invention, the optical switch unit may include a controller controlling a cycle of the time division scheme, and the controller may determine a distribution cycle of the optical switch unit on the basis of a length of the monitoring optical line.

In an embodiment of the present invention, the signal processing unit may measure a length of the monitoring optical line and transmit data regarding the measured length to the controller.

In an embodiment of the present invention, the optical switch unit may distribute the input optical signal to each output port on a first time cycle, and the signal processing unit may set a new time domain according to the first time cycle to process the signal.

In an embodiment of the present invention, the input optical signal may include two or more wavelength bands, and the optical switch unit may distribute the input optical signal according to a wavelength division scheme.

In an embodiment of the present invention, the optical switch unit may include a plurality of optical switches connected in a relay manner.

In an embodiment of the present invention, the optical switch unit may include a microelectro-mechanical system (MEMS) optical switch.

In an embodiment of the present invention, the optical switch unit may include a magnetic optical switch.

In an embodiment of the present invention, the optical line monitoring system may further include: an optical coupler dividing and extracting a portion of the input optical signal between the laser diode and the optical switch unit; and a tap photodiode detecting power of the extracted input optical signal.

In an embodiment of the present invention, the optical line monitoring system may further include: a reference optical line connected between the optical element and the monitoring optical line.

In an embodiment of the present invention, optical line monitoring system may further include: a communication unit transmitting data processed by the signal processing unit through a network.

In an embodiment of the present invention, the communication unit may support an Ethernet network or a cellular wireless network.

In an embodiment of the present invention, the monitoring optical line may be formed in a pattern having a space narrower than a predetermined distance and coupled to a security fence.

In an embodiment of the present invention, the at least one monitoring optical line may be coupled to security fences installed in different areas, respectively.

In an embodiment of the present invention, the optical element may be either an optical circulator or an optical coupler.

In an embodiment of the present invention, the optical line monitoring system may further include: an optical coupler dividing and extracting a portion of the input optical signal or the reflected optical signal between the optical switch unit and the monitoring optical line; and a tap photodiode detecting power of the extracted input optical signal or reflected optical signal.

Advantageous Effects

The optical line monitoring system according to an embodiment of the present invention may monitor an area as large as possible by the single optical line monitoring device.

Also, the optical line monitoring system according to an embodiment of the present invention may maximize accuracy of intrusion detection, while monitoring an area as large as possible.

Also, the optical line monitoring system according to an embodiment of the present invention is economical and has excellent durability.

DESCRIPTION OF DRAWINGS

FIG. 1 is a block diagram illustrating an optical design of an optical line monitoring system according to an embodiment of the present disclosure.

FIG. 2 is a view schematically illustrating a configuration of an optical line monitoring system according to an embodiment of the present disclosure.

FIGS. 3 to 5 are block diagrams illustrating a use state of an optical line monitoring system according to an embodiment of the present disclosure.

BEST MODES

Hereinafter, embodiments of the present invention will be described in detail with reference to the accompanying drawings. In describing the present invention, if it is determined that a detailed description of known functions and components associated with the present invention unnecessarily obscure the gist of the present invention, the detailed description thereof will be omitted. The terms used henceforth are used to appropriately express the embodiments of the present invention and may be altered according to a person of a related field or conventional practice. Therefore, the terms should be defined on the basis of the entire content of this specification.

Hereinafter, an optical line monitoring system according to an embodiment of the present disclosure will be described with reference to FIGS. 1 to 4.

FIG. 1 is a block diagram illustrating an optical design of an optical line monitoring system according to an embodiment of the present disclosure. FIG. 2 is a view schematically illustrating a configuration of an optical line monitoring system according to an embodiment of the present disclosure. FIGS. 3 and 4 are block diagrams illustrating a use state of an optical line monitoring system according to an embodiment of the present disclosure.

Referring to FIG. 1, the optical line monitoring system includes an optical line monitoring device 100 for monitoring an optical line, and a monitoring optical line 200.

The optical line monitoring device 100 may be an optical time domain reflectometer (OTDR) which monitors an optical line by measuring a back scattering light generated when an optical signal is input to the optical line. The optical line monitoring device 100 may detect an event such as cutting, bending, connection, and splicing of the optical line. Also, the optical line monitoring device 100 may recognize a location of the optical line where such an event occurs.

The optical line monitoring device 100 may include a laser diode (LD) 110, an optical line 120, an optical switch unit 130, a photo diode 140, a signal processing unit 150, an optical coupler 160, a reference optical line 170, and a communication unit 180.

The LD 110 generates an input optical signal. A pulse generator may be connected to the LD 110. The pulse generator generates a pulse signal having a specific pattern. The LD 110 generates an input optical signal upon receiving the pulse signal. The input optical signal is input to the monitoring optical line 200 through the optical element 120 the optical switch unit 130, and the like, as described hereinafter.

The laser diode 110 may include a temperature adjusting unit (not shown). The temperature adjusting unit may adjust output power by measuring a temperature of the LD 110. The temperature adjusting unit may further include a TEC or a heating element to actively adjust the temperature of the LD 110.

The optical element 120 includes a first port 121, a second port 122, and a third port 123. The first port 121 of the optical element 120 is connected to an output terminal of the LD 110. The input optical signal input through the first port 121 is output to the second port 122 through the optical element 120. The second port 122 of the optical element 120 is connected to the optical switch unit 130 and the monitoring optical line 200. When an input optical signal is input to the monitoring optical line 200 through the optical element 120, a reflected optical signal may be reflected and input to the second port 122. The reflected optical signal input to the second port 122 is output to the third port 123 through the optical element 120.

Here, the optical element 120 may be an optical circulator or an optical coupler.

The optical switch unit 130 includes an input port 131 and output ports 132 to 135. The input port 131 and the output ports 132 to 135 of the optical switch unit 130 are not used only for the purpose of inputting and outputting optical signals. The names of the input port 131 and the output ports 132 to 135 are determined on the basis of the input optical signal. Accordingly, the input optical signal is input to the input port 131 and the input optical signal is output to the output ports 132 to 135. Meanwhile, the reflected optical signal is input to the output ports 132 to 135 and output to the input port 131.

The input port 131 of the optical switch unit 130 is connected to the second port 122 of the optical element 120. There may be two or more output ports 132 to 135 of the optical switch unit 130. The output ports 132 to 135 of the optical switch unit 130 may each be connected to the monitoring optical line 200.

The optical switch unit 130 may distribute the input optical signal input to the input port 131 to the output ports 132 to 135 in various manners. For example, the optical switch unit 130 may divide the input optical signal according to a time division scheme or a wavelength division scheme. The distribution of the input optical signal by the optical switch unit 130 will be described hereinafter.

The optical switch unit 130 may include one or two or more optical switches 136. When the optical switch unit 130 includes two or more optical switches 136, the optical switches 136 may be connected in a relay (serial) manner. As the optical switches 136 are connected in the relay manner, the number of output ports of the optical switch unit 130 may increase. As illustrated in FIG. 1, when the optical switch unit 130 includes three optical switches 136 connected in the relay manner, each of the optical switches 136 has one input port and two output ports, and the entire optical switch unit 130 has one input port 131 and four output ports 132 to 135.

The optical switch unit 130 may include a MEMS optical switch 136. Also, the optical switch unit 130 may include a magnetic optical switch 136.

The photodiode 140 is connected to the third port 123 of the optical element 120. The photodiode 140 receives and detects a reflected optical signal input to the second port 122 of the optical element 120. The photodiode 140 may be an avalanche photodiode (APD).

The photodiode 140 may include a temperature adjusting unit (not shown). The temperature adjusting unit may adjust receive sensitivity by measuring a temperature of the photodiode 140. The temperature adjusting unit may further include a TEC or a heating element to actively control a temperature of the photodiode 140.

The signal processing unit 150 receives and processes data regarding to a detection result of the photodiode 140. In detail, the signal processor 150 expresses and analyzes a magnitude of the reflected optical signal measured by the photodiode 140 in a time domain. In case where the magnitude of the reflected optical signal analyzed in the time domain varies irregularly or changes in a specific pattern, the signal processing unit 150 may determine it as occurrence of an event. When it is determined that an event has occurred, an event alarm may be made.

The communication unit 180 may transmit an analysis result of the signal processing unit 150 and an event alarm. In detail, the communication unit 180 may be connected to a central office present at another location via an Ethernet network or a cellular wireless network. The communication unit 180 may transmit the analysis result of the signal processing unit 150 and the event alarm to the central office.

The optical line monitoring device 100 may further include an optical coupler 160 and a tap photodiode 161. The optical coupler 160 is connected between the LD 110 and the optical switch unit 130. Preferably, the optical coupler 160 may be connected between the LD 110 and the optical element 120. The optical coupler 160 may divide and extract a portion of the input optical signal. For example, the optical coupler 160 may divide and extract a signal corresponding to power of 0.1% to 10% of the input optical signal. The tap photodiode 161 measures power of the extracted input optical signal. The laser diode 110 may be monitored or controlled according to the measurement result.

According to circumstances, the optical coupler and the tap photodiode may be connected between the optical switch unit and the monitoring optical line. Here, the optical coupler may divide and extract a portion of the input optical signal or the reflected optical signal. Also, the tap photodiode may detect power of the extracted input optical signal or the reflected optical signal.

Also, the optical line monitoring device 100 may further include the reference optical line 170. The reference optical line 170 is connected between the optical element 120 and the monitoring optical line 200. The reference optical line 170 may be an optical fiber having a predetermined length. For example, the reference optical line 170 may be an optical fiber having a length of 100 m to 2000 m. The optical fiber of the reference optical line 170 may be in a form of being wound in one direction around a spool within the optical line monitoring device 100.

The input optical signal passes through the reference optical line 170 before it is input to the monitoring optical line 200 through the optical switch unit 130. The reflected optical signal generated as the input optical signal passes through the reference optical line 170 may be compared with the reflected optical signal generated by the monitoring optical line 200 to be described later, and analyzed.

The monitoring optical line 200 is an optical line capable of detecting an intrusion into a specific area, or the like. The optical line may be an optical fiber continuous in a predetermined length. The monitoring optical line 200 has opposing ends. At least one end of the monitoring optical line 200 is connected to an output port of the optical switch unit 130. In FIG. 1, it is illustrated that opposing ends of one monitoring optical line 200 are connected to two output ports of the optical switch unit 130, respectively.

However, according to circumstances, only one end of the monitoring optical line 200 may be connected to one output port of the optical switch unit 130 and the other end thereof may be open, rather than being connected to the output port of the other optical switch unit 130. In this case, although the switch unit has the same number of output ports, a larger number of the monitoring optical lines 200 may be coupled.

One end of the monitoring optical line 200 and the output ports 132 to 135 of the optical switch unit 130 are preferably connected through an APC connector. When the one end of the monitoring optical line 200 and the output ports 132 to 135 of the optical switch unit 130 are connected through an APC connector, reflection from the connector may be minimized. More preferably, one end of the monitoring optical line 200 and the output ports 132 to 135 of the optical switch unit 130 may be connected through an FC/APC connector.

An input optical signal is input to the monitoring optical line 200. In detail, an input optical signal is input to one end or both ends of the monitoring optical line 200 connected to the output port of the optical switch unit 130. The input optical signal generates a reflected optical signal, while traveling in the monitoring optical line 200. The reflected optical signal travels in a direction opposite to that of the input optical signal. The reflected optical signal is backscattering light generated by the input optical signal. The backscattering light includes results of Ryleigh scattering and Fresnel reflection. The reflected optical signal may be a combination of the two results. The reflected optical signal may be analyzed to detect an event such as cutting, bending, connection, and splicing of the monitoring optical line 200. Also, a position of the monitoring optical line 200 at which the event has occurred may also be detected. The reflected optical signal is input to the second port 122 of the optical element 120 and output to the third port 123.

Referring to FIG. 2, the monitoring optical line 200 may be an optical network formed to be woven in a pattern having a space narrower than a predetermined distance. For example, the monitoring optical line 200 may be formed in a zigzag pattern having intervals of a few centimeters to tens of centimeters from another neighboring optical fiber. Preferably, the pattern interval of the monitoring optical line 200 is smaller than a size of an object which has an intention of intruding. The monitoring optical line 200 may have a net-like shape having a predetermined height and extending in one direction. The monitoring optical line 200 may be a net formed of optical fibers having a total length of about 10 km to 30 km, for example, and extending with a length of about 100 m to 1 km. A shape of the monitoring optical line 200, a method of forming the pattern, a total extending length, a length of the formed net, and the like, are variable depending on applied situations. The monitoring optical line 200 may be coupled to a security fence.

When an intruder attempts to intrude, the intruder comes into contact with the net of the monitoring optical line 200 formed in the pattern. Accordingly, the monitoring optical line 200 may be changed in a degree of bending, twisted in a screw direction, folded, or severed. These cause a change in the reflected optical signal. The change may be detected by the photodiode 140 and analyzed and determined as an event by the signal processing unit 150 as described above.

According to circumstances, the monitoring optical line 200 may be used to detect vibrations, a change in temperature, as well as detecting an intrusion. This is because, the reflected optical signal may be changed when vibration is applied to the monitoring optical line 200 or a temperature of the monitoring optical line 200 is changed.

Two or more monitoring optical lines 200 may be present. Optical nets formed by the different monitoring optical lines 200 may be respectively coupled to security fences installed in different areas.

An operating method of the optical switch unit 130 and a corresponding monitoring method of the optical line monitoring system will be described hereinafter with reference to FIGS. 3 and 4.

The optical switch unit 130 may further include a controller 137 controlling connection between the input port 131 and the output port of the optical switch 136. The controller 137 may control an order, a scheme, a period, and the like, for connecting the input port 131 and the output port.

For the purposes of description, it is assumed that the optical switch unit 130 includes four output ports 132 to 135, for example. However, it is obvious that the output ports 132 to 135 are not limited to the four ports.

The four output ports 132 to 135 are referred to as first to fourth output ports 132 to 135. The first to fourth output ports 132 to 135 are not designated according to a specific order or rule but designated arbitrarily.

The optical switch unit 130 may distribute the input optical signal in a time division manner. In detail, the optical switch unit 130 may optically connect the input port 131 and the first output port 132 during a first time period, optically connect the input port 131 and the second output port 132 during a second time period, optically connect the input port 131 and the third output port 134 during a third time period, and optically connect the input port 131 and the fourth output port 135 during a fourth time period, according to time.

FIG. 3 is a view schematically illustrating a use state of the optical line monitoring system during the first time period, and FIG. 4 is a view schematically illustrating a use state of the optical line monitoring system during the second time period.

Here, the first to fourth time periods may be the same time period or different time periods. In addition, an interval time period for changing optical connections between the input port 131 and the output ports 132 to 135 may be provided between each of the first to fourth time periods. For example, the interval time may be a time required for a state in which the input port 131 and the first output port 132 are optically connected to each other to a state in which the input port 131 and the second output port 133 are optically connected, in the optical switch unit 130.

For example, the first to fourth time periods may be 0.2 seconds to 20 seconds, respectively, and the interval time period may be 0.01 second to 2 seconds.

Here, the first time period may be longer than a time required for the input optical signal to be input to the monitoring optical line 200 connected to the first output port 132 from the first output port 132 and to reach an end of a section of the monitoring optical line 200 intended to be monitored and a reflected optical signal formed as the input optical signal is reflected from the end to reach the first output port 132 of the optical switch unit 130.

The section of the monitoring optical line 200 intended to be monitored may be the entire section of the monitoring optical line 200 or may be a section corresponding to a half of the monitoring optical line 200. In particular, in case where both ends of the monitoring optical line 200 are connected to different output ports, the monitoring optical line 200 corresponding to the half adjacent to one end may be monitored through the input optical signal input through the output port connected to the one end and the monitoring optical line 200 corresponding to the half adjacent to the other end may be monitored through the input optical signal input through the output port connected to the other end.

The second to fourth time periods and the second to fourth output ports 133 to 135 are similar to the first time period and the first output port 132.

The controller 137 of the optical switch unit 130 may determine a distribution period on the basis of a length of the monitoring optical line 200 connected to each output port. The optical switch unit 130 may receive data regarding the length of the monitoring optical line 200 from the signal processing unit 150. The signal processing unit 150 may measure the length of the monitoring optical line by comparing and analyzing the input optical signal and the reflected optical signal. According to the circumstances, lengths of the monitoring optical lines respectively connected to the output ports may be different, and a time of connection to each output port may be changed accordingly. For example, when the length of the monitoring optical line is relatively long, a time for the output port connected to the monitoring optical line to be optically connected to the input port 131 may be relatively long.

The signal processing unit 150 may set a new time domain according to a connection period determined by the controller 137 of the optical switch unit 130. Characteristics of the reflected optical signals of the monitoring optical line 200 corresponding to the new time domain are recorded.

This optical line monitoring system includes a plurality of monitoring optical lines 200 in one optical line monitoring device 100. The one optical line monitoring device 100 monitors a plurality of monitoring optical lines 200 in a time division manner. As described above, one monitoring optical line 200 is monitored at a period of a few seconds to tens of seconds. Therefore, since the plurality of monitoring optical lines 200 are monitored at a sufficiently short period, a monitoring area that may be covered by one optical line monitoring device 100 may be maximized, while guaranteeing accuracy of monitoring. This may reduce cost and facilitate management of the optical line monitoring device 100.

Hereinafter, an optical line monitoring system according to another embodiment of the present invention will be described with reference to FIG. 5.

FIG. 5 is a block diagram illustrating a use state of an optical line monitoring system according to another embodiment of the present invention.

For the purposes of description, the optical line monitoring system according to another embodiment will be described on the basis of differences from those described above with reference to FIGS. 1 to 4. Another embodiment to be described below features that an optical switch unit 130 distributes an input optical signal in a wavelength division manner.

The optical switch unit 130 distributes the input optical signal in the wavelength division manner. An LD 110 generates input optical signals including two or more wavelength bands. These input optical signals pass through the optical switch unit 130 and are divided and distributed to respective output ports by wavelengths. The optical switch unit 130 may be an optical filter that distributes the input optical signals to respective output ports according to wavelengths.

So far, embodiments of the optical line monitoring system of the present invention have been described. The present invention is not limited to the above-described embodiments and the accompanying drawings, and various modifications and changes may be made in view of a person skilled in the art to which the present invention pertains. Therefore, the scope of the present invention should be determined by the scope of the appended claims, and equivalents thereof.

The invention claimed is:

1. An optical line monitoring system comprising:
   a laser diode generating an input optical signal;
   an optical element receiving the input optical signal by a first port and outputting the received input optical signal to a second port and receiving a reflected optical signal by the second port and outputting the received reflected optical signal to a third port;
   an optical switch unit receiving the input optical signal by an input port connected to the second port of the optical element and distributing the input optical signal to at least two output ports;
   at least one monitoring optical line connected to each of the output ports of the optical switch unit;
   a photodiode connected to the third port of the optical element and detecting the reflected optical signal; and
   a signal processing unit processing the signal detected by the photodiode, wherein the optical switch unit distributes the input optical signal according to a time division scheme, wherein the optical switch unit includes a controller controlling a cycle of the time division scheme and determining a cycle of the distribution by the optical switch unit based on a length of the monitoring optical line measured and transmitted to the controller by the signal processing unit.

2. The optical line monitoring system of claim 1, wherein the optical switch unit distributes the input optical signal to each output port on a first time cycle, and
   the first time cycle is longer than a time for which the input optical signal is generated in the laser diode and reaches an end of the monitoring optical line and a reflected optical signal formed as the input optical signal is reflected from the end of the monitoring optical line reaches the optical switch unit.

3. The optical line monitoring system of claim 1, wherein the optical switch unit distributes the input optical signal to each output port on a first time cycle, and the signal processing unit sets a new time domain according to the first time cycle to process the signal.

4. The optical line monitoring system of claim 1, wherein the input optical signal includes two or more wavelength bands, and
   the optical switch unit distributes the input optical signal according to a wavelength division scheme.

5. The optical line monitoring system of claim 1, wherein the optical switch unit includes a plurality of optical switches connected in a relay manner.

6. The optical line monitoring system of claim 1, wherein the optical switch unit includes a microelectro mechanical system (MEMS) optical switch.

7. The optical line monitoring system of claim 1, wherein the optical switch unit includes a magnetic optical switch.

8. The optical line monitoring system of claim 1, further comprising:
   an optical coupler dividing and extracting a portion of the input optical signal between the laser diode and the optical switch unit; and
   a tap photodiode detecting power of the extracted input optical signal.

9. The optical line monitoring system of claim 1, further comprising:
   a reference optical line connected between the optical element and the monitoring optical line.

10. The optical line monitoring system of claim 1, further comprising:
    a communication unit transmitting data processed by the signal processing unit through a network.

11. The optical line monitoring system of claim 10, wherein
    the communication unit supports an Ethernet network or a cellular wireless network.

12. The optical line monitoring system of claim 1, wherein
    the monitoring optical line is formed in a pattern having a space narrower than a predetermined distance and coupled to a security fence.

13. The optical line monitoring system of claim 12, wherein
    the at least one monitoring optical line is coupled to security fences installed in different areas, respectively.

14. The optical line monitoring system of claim 1, wherein
    the optical element is either an optical circulator or an optical coupler.

15. The optical line monitoring system of claim 1, further comprising:
    an optical coupler dividing and extracting a portion of the input optical signal or the reflected optical signal between the optical switch unit and the monitoring optical line; and
    a tap photodiode detecting power of the extracted input optical signal or reflected optical signal.

16. The optical line monitoring system of claim 1, wherein the optical switch unit distributing the input optical signal to a first monitoring optical line of the at least one monitoring optical line at a first cycle of the distribution determined by the controller based on the length of the first monitoring optical line and to a second monitoring line of the at least one monitoring optical line at a second cycle of the distribution determined by the controller based on the length of the second monitoring optical line.

* * * * *